United States Patent [19]

Röhm

[11] Patent Number: 4,621,820

[45] Date of Patent: Nov. 11, 1986

[54] PERCUSSION DRILLING APPARATUS

[76] Inventor: Günter H. Röhm, Heinrich-Röhm-Str. 50, 7927 Sontheim, Fed. Rep. of Germany

[21] Appl. No.: 720,259

[22] Filed: Apr. 5, 1985

[30] Foreign Application Priority Data

Apr. 11, 1984 [DE] Fed. Rep. of Germany ....... 3413581

[51] Int. Cl.[4] ............................................. B23B 31/08

[52] U.S. Cl. ...................................... 279/1 B; 173/48; 279/19.3; 279/1 K; 279/62

[58] Field of Search ............... 279/1 K, 1 ME, 60–65, 279/19, 19.3–19.5, 1 R, 1 B, 81, 89, 90, 93, 76, 79, 80; 173/47, 48, 114, 115; 408/241 R; 409/231, 232, 234

[56] References Cited

U.S. PATENT DOCUMENTS

| | | | |
|---|---|---|---|
| 1,407,589 | 2/1922 | Slater | 173/105 X |
| 3,133,601 | 5/1964 | Fulop | 173/119 X |
| 3,929,343 | 12/1975 | Wanner et al. | 279/1 B |
| 4,491,444 | 1/1985 | Rumpp et al. | 173/114 X |
| 4,502,824 | 3/1985 | Dohse et al. | 173/13 X |

FOREIGN PATENT DOCUMENTS

| | | | |
|---|---|---|---|
| 2806797 | 8/1979 | Fed. Rep. of Germany | 279/60 |
| 356396 | 9/1961 | Switzerland | 173/47 |
| 2030485 | 4/1980 | United Kingdom | 279/60 |

*Primary Examiner*—Gil Weidenfeld
*Assistant Examiner*—Steven C. Bishop
*Attorney, Agent, or Firm*—Karl F. Ross; Herbert Dubno

[57] ABSTRACT

A drill chuck assembly for a percussion or hammer drill in which the chuck body is mounted on a rotatable drill spindle and the hammer impact is transmitted by a ram through the spindle to the bit retained in the chuck. A coupling ring surrounding a coaxial portion of the chuck body and the spindle has three angular positions in one of which the chuck body can be withdrawn axially from the spindle and in the second and third of which the body is retained on the spindle. Formations between a shoulder of the spindle and the coupling ring come into play in the second position to permit limited axial displacement of the chuck body on the spindle and are effective in the third position to prevent such axial displacement.

16 Claims, 4 Drawing Figures

FIG.3a
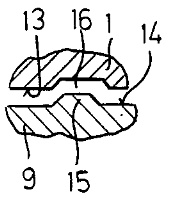
FIG.3b
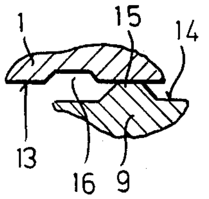
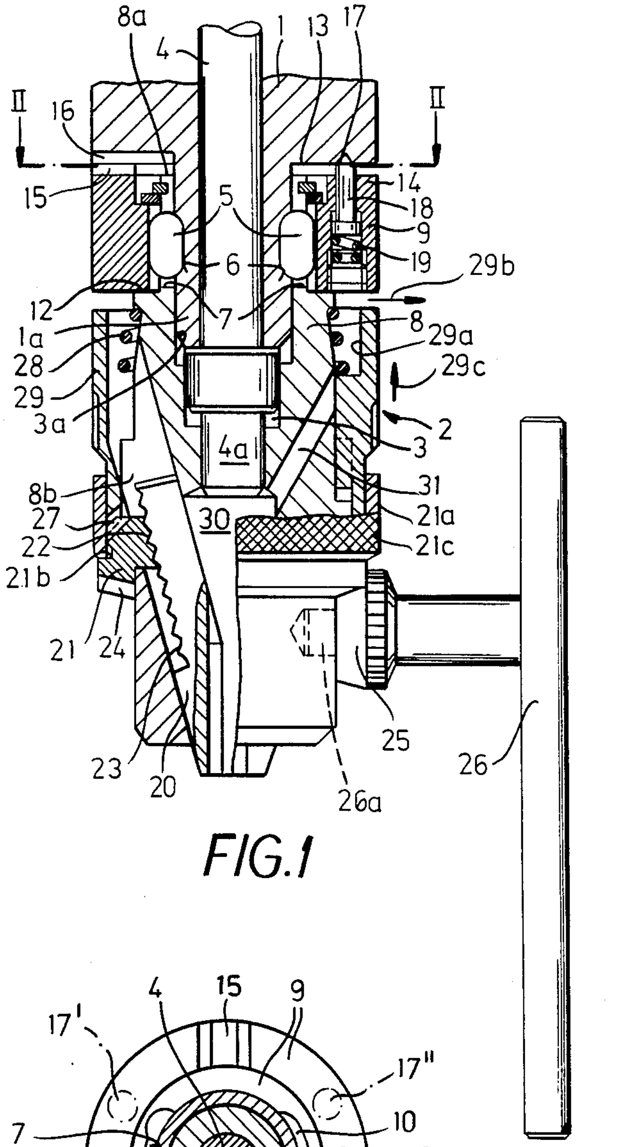
FIG.1
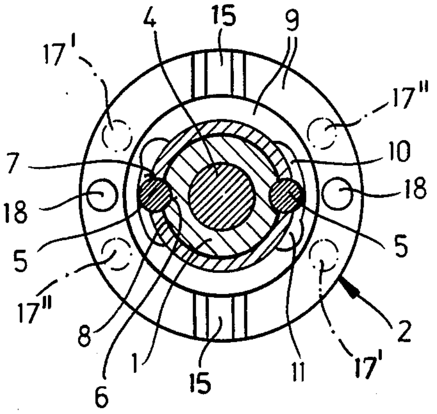
FIG.2

PERCUSSION DRILLING APPARATUS

CROSS REFERENCE TO RELATED APPLICATIONS

This application is related to my copending application Ser. No. 703,888 filed Feb. 21, 1985 corresponding to German patent document No. 34 06 668 and to the copending Ser. No. 654,791 filed Sept. 26, 1984 corresponding to German patent document-utility model DE-GM No. 83 27 665.

FIELD OF THE INVENTION

My present invention relates to a rotary hammer drill chuck and, more particularly, to a hammer drill chuck for a rotary drill spindle traversed by an impact-generating ram.

BACKGROUND OF THE INVENTION

A percussion drilling apparatus can have a drill chuck driven rotatably by a drill spindle, which has an axial passage through which the percussion effect is communicated to a drill held between central movable chuck jaws by a ram member movable axially in and traversing the hollow drill spindle.

A coupling member can be provided for coupling of the drill chuck with the drill spindle, the coupling member being adjacent to or between the drill spindle and the body of the drill chuck.

The coupling member can be axially fixed, but rotatable, and provided with a coupling sleeve surrounding it, securing it, and shiftable to different angular positions about the chuck axis, for example a position in which the coupling member is held firmly in the coupling cavities of the drill spindle, and a further one in which the drill chuck can be removed from the drill spindle.

A drill chuck of this type is known in the art in which drill chuck axial free play is not allowed, which means, that the coupling cavities holding the coupling member in the drill spindle and in the chuck body have the same dimensions in the axial direction as the coupling member, so that the coupling member is held in the coupling cavities in a fixed position axially without axial play during drilling.

Furthermore the coupling sleeve, with the aid of a setscrew which can extend radially of the coupling sleeve, is held against the chuck body, but a comparatively high clamping force is required, because the coupling sleeve contains the guide cavities for the retaining screws for the drill chuck and therefore in operation at no time can rotation of the chuck body be allowed.

However, while no axial play at the chuck with respect to the spindle is desired for rotational drilling, for percussion drilling it is desirable that the drill chuck have some axial displacement play with respect to the drill spindle, in order to prevent the drill chuck with its mass from taking part in the percussion motion which might reduce the percussion effect and its corresponding drilling efficiency. It is also desirable to avoid the use of setscrews and the like which may slip during the drilling operation.

OBJECTS OF THE INVENTION

The general object of my invention is to provide an improved rotary hammer drill chuck obviating the drawbacks of prior art chucks.

It is an object of this invention to provide a percussion drilling apparatus of the kind described above, but in which axial play of the drill chuck with respect to the drill spindle is permitted.

It is also an object of this invention to provide an improved percussion drilling apparatus in which drilling with or without axial play of the drill chuck selectively is possible according to the desire of the operator.

It is a further object of this invention to provide an improved percussion drilling apparatus in which the mode of drilling may be easily and quickly switched between a mode in which axial play of the drill chuck is allowed and one in which axial play of the drill chuck is prevented.

It is yet another object of this invention to provide an improved system of holding the drill chuck rotatably fixed relative to the drill spindle so that it does not accidently slip during rotary drilling.

Yet a further object of my invention is to extend the principles of my earlier applications mentioned above.

SUMMARY OF THE INVENTION

These objects and others, which will become apparent hereinafter, are attained in accordance with the invention in a percussion drilling apparatus comprising a drill chuck driven rotatably by a drill spindle, which has an axial passage through which the percussion effect is communicated to a drill held between central movable chuck jaws by an impact ram extending axially through the hollow spindle. A coupling member is provided for rotatably coupling the drill chuck to the drill spindle, the coupling member forming an antirotation key and being received in the drill spindle and the body of the drill chuck in respective coupling cavities. This member is received in a recess in the spindle and a recess in the chuck body, one of these recesses being axially longer than the coupling member to permit an axial play of the chuck body relative to the spindle.

The coupling member is held in place within these recesses by a coupling ring having a plurality of angular or rotary positions about the chuck axis including one position in which the coupling member is held firmly in the coupling cavities or recesses and an uncoupled position in which the coupling member is removed from one of the coupling cavities or recesses, e.g. the recess in the drill spindle so that the drill chuck can be axially removed from the drill spindle.

According to an essential feature of the invention, means controlled by the ring is provided so that the percussion drilling apparatus can be selectively operated with or without axial play of the drill chuck relative to the drill spindle and that that choice can be quickly and easily made.

Accordingly, the coupling ring is axially juxtaposed with a circular shoulder on the drill spindle. Detent means is provided upon the juxtaposed surfaces of the ring and shoulder to index the ring in one of its selected positions.

For example, the circular surface of the coupling ring or the surface of the circular shoulder of the drill spindle facing each other are provided with axially directed projections wich stop axial free play of the drill chuck on the drill spindle when they are pressed and held against the opposing circular surface in the third position of the ring.

Indentations are provided in the circular surface opposed to the surface having the projections thereon and these opposing surfaces can be oriented so that the indentations are coincident with the projections and the indentations have sufficient depth (at least as deep as the desired free play displacement) so as to allow the axial free play motion of the drill chuck.

In the chuck of my invention therefore only a twist or rotation of the coupling sleeve is necessary to switch the mode of operation between one with and without chuck free play.

In the preferred embodiment therefore there are three rotary positions of the coupling sleeve corresponding to three modes of operation: one in which the drill chuck can be removed from the drill spindle, another in which the impact drilling occurs with axial chuck free play, and a third for rotary drilling without axial play.

Preferably the coupling sleeve is held in its three rotary positions firmly by the detent mechanism which can comprise axially spring biased lock pins in the coupling sleeve which are fed toward and press on the opposing circular shoulder of the drill spindle and can engage lock depressions provided therein to halt the rotary motion of the coupling sleeve.

BRIEF DESCRIPTION OF THE DRAWING

The above and other objects, features and advantages of the invention will become more readily apparent from the following detailed description, reference being made to the accompanying drawing in which:

FIG. 1 is a partially axial cross-sectional, partially elevational view of the percussion drilling apparatus according to the invention;

FIG. 2 is a cross-sectional view taken along the line II—II of FIG. 1; and FIGS. *3a* and *3b* are cutaway sectional views showing two operating positions of the chuck, FIG. *3a* showing the operating configuration with free play of the drill chuck allowed, while FIG. *3b* shows the operating configuration with axial free play eliminated.

SPECIFIC DESCRIPTION

The percussion drilling apparatus shown in the drawing comprises a partially shown drill spindle 1 which may be coupled to and rotatably drive a drill chuck 2 and which is driven by an electric motor of a hammer drill.

This drill chuck 2 has a central axial passage 3*a* into which the boss 1*a* of the hollow drill spindle 1 extends. The passage 3*a* extends into a throughgoing bore 3 into which an axially movable impact ram 4 is guided, the ram passing through the spindle 1 and being axially impacted by the conventional drill mechanism not shown. The end 4*a* of the ram 4 impacts against an end of a drill bit, not shown, held in the chuck.

The mode of coupling drill chuck 2 to drill spindle 1 is a key feature of this invention.

A pair of coupling members 5 serve to rotationally couple the drill spindle 1 to the drill chuck 2 so as to permit limited relative axial movement of the latter relative to the spindle.

The coupling members 5, are end-rounded, nearly cylindrical-shaped pieces.

The coupling members 5 are received in coupling cavities 6 of the spindle 1 and in coupling cavities 7 of the extension 8*a* of the chuck body 8 extended along and toward the drill spindle 1. The cavities 7 are longer than the cavities 6 by an amount in the axial direction to permit the desired degree of axial play. To operate the coupling members 5 a coupling sleeve 9 which contacts the coupling member 5 is provided axially between shoulders 13 and 12 of the drill spindle 1 and chuck body 8, respectively. The coupling sleeve 9 can be releasably indexed in a plurality of rotary or angular positions about the chuck axis as will be illustrated below in further detail.

This coupling sleeve 9 holds the coupling members 5 in the coupling cavities 6 of drill spindle 1 firmly when the sleeve is in a first or a second coupled angular position, but can be rotated to assume an uncoupled angular position in which the coupling members 5 are no longer held by coupling cavities 6 and thus chuck 2 may be uncoupled from the drill spindle 1.

To this end the interior surface of coupling sleeve 9 has adjacent to each coupling member 5 a coupling surface 10 formed by indenting coupling sleeve 9 and extended over a circular segment or arc corresponding to the range of rotation of coupling sleeve 9.

The clockwise extreme end of each coupling surface 10 is further indented to form recesses 11 having a sufficient radial depth so that the respective coupling member 5 can be cammed radially away from the coupling cavity 6 in the drill spindle 1 sufficiently to clear the cavity when the recess 11 radially registers with the coupling member 5.

In this position the coupling between the drill spindle 1 and the chuck body 8 is broken so that the drill chuck 2 can be drawn axially from the drill spindle 1. The recesses 10 and the coupling cavities 7 have axial dimensions which exceed the axial extent of the coupling members 5, so that when coupling members 5 are firmly held in coupling cavities 6 to the drill spindle, chuck body 8 and hence drill chuck 2 have an axially directed free play relative to the drill spindle 1.

It is, of course, also possible instead to make the coupling cavities 6 axially larger than the coupling member 5, while making the axial extent of coupling cavities 7 correspond to that of coupling member 5 in an alternative embodiment.

The coupling sleeve 9, which is supported axially by the circular shoulder 12 of chuck body 8, is axially positioned adjacent or juxtaposed axially with the circular shoulder 13 of the drill spindle 1.

The circular shoulder 14 of coupling sleeve 9 positioned opposing the circular shoulder 13 of drill spindle 1 is provided with axially directed projections 15 which—provided the corresponding rotary position of coupling sleeve 9 can be assumed—can press directly against the opposing circular surface of shoulder 13 of the drill spindle 1 as shown in FIG. *3b* and thereby take up the axial play. In this first coupled rotary position of coupling sleeve 9 members 15, which are diametrically opposite radial ribs, bridge spaces between the shoulder 13 of drill spindle 1 and the coupling sleeve 9 and the axial free play of the chuck 2 will be prevented. Indentations 16 are provided in the circular shoulder 13 which can register with the projections 15 and are dimensioned to fully receive them.

The indentations 16 have at least a depth sufficient to allow the desired amount of axial free play of the drill chuck 2.

The coupling sleeve 9 is rotatable to a second coupled rotary position in which it holds the coupling members 5 firmly to drill spindle 1 but projections 15 are positioned to be coincident axially with indentations 16 as shown in FIG. *3a*. In this position of coupling sleeve 9 the free play of drill chuck 2 on the drill spindle 1 is unimpaired.

So that coupling sleeve 9 can be held firmly in each of its three rotary positions (in which axial free play is eliminated or allowed or the drill chuck 2 is detachable from the drill spindle 1), a detent or indexing mechanism is provided, which comprises opposed pairs of locking depressions 17, 17' and 17" provided on the circular shoulder 13 of drill spindle 1 positioned corresponding to the three rotary positions of the coupling sleeve 9 and lock pins 18 which are fed axially from and through the coupling sleeve 9 and which jut out from the coupling sleeve 9 to press against circular shoulder 13 of drill spindle 1 under the force of springs 19 positioned axially below the lock pins 18 as shown in FIG. 1. The three pairs of lock depressions 17, 17' and 17" are located as shown in FIG. 2 with depressions 17' and 17" being illustrated in dot-dash lines with the lock pins 18 at times engaging one of the three pairs of lock depressions. The middle pair of lock depressions 17 happens to be that which, in the drawing, receives the lock pins 18.

The pair of lock depressions 17' correspond to the drill chuck removal position. The pair of lock depressions 17 correspond to a drilling configuration with axial free play of the drill chuck 2 allowed. Finally, the pair of lock depressions 17" correspond to a drilling configuration in which axial free play is prevented, for example when purely rotary drilling is desired and the requisite drilling precision would be compromised by the axial play.

The allowed displacement of lock pins 18 with respect to drill chuck 2 must be large enough to allow the desired axial motion free play of the chuck 2 with respect to spindle 1. Furthermore the locking mechanism must be disengageable by, for example, manual rotation of the ring 9 to cam the pins 18 out of the depressions.

In chuck body 8 the central movable clamp jaws 20 are fed axially and are adjustable by rotation of operating ring 21. When the axially fixed operating ring 21 is rotated, the internal threads 22 of operating ring 21 engage the external toothing 23 of the clamp jaws 20 to feed the clamp jaws 20 inclinedly axially. The operating ring 21 has a toothed end rim 24 for engagement by the toothed bevel gear 25 attached to chuck key 26 for tightening or loosening.

The operating ring 21 has on the end turned away from the end with toothed rim 24 an additional toothed rim 27, which is pressed against the edge gear of axially shiftable locking sleeve 29 by a spring 28.

FIG. 1 shows that the sleeve 29 is keyed to the chuck body 8 and is nonrotatable relative thereto and engageable with ring 21 so that undesirable loosening or retightening of the drill chuck 2 during the drilling or percussion drilling operation is eliminated.

Drilling waste from the drill cavity 30 can be fed through the chuck body 8 through outer running channel 31.

The operating ring 21, which has the bevel ring gear 24 which can mesh with the bevel pinion 25 of the chuck key 26 whose pin **26*a* is insertable in a radial blind bore of the chuck body 8, also carries an actuating sleeve 21*a*, the lower end of which is clenched in a groove 21b of the ring 21 and is knurled at 21*c*** to facilitate manual gripping of this sleeve.

This sleeve is of the type described in the aforementioned copending applications.

The lower end of the locking sleeve 29 is received in the actuating sleeve **21*a* while the upper end defines an axial open clearance 29*a* with the chuck body into which the passages 31 can open. The passages 31, like the passages 8*b* of the chuck body in which the jaws 20 are guided, serve to clear drilling wastes by a combination of gravity and centrifugal force, discharging these wastes into the axial clearance 29*a* from which they can be discharged outwardly in the direction of arrow 29*b* between the locking sleeve 29 and the coupling ring 9** especially when the assembly is used for overhead hammer drilling.

The jaws are operated in the manner described in the above-identified applications as well, i.e. when the locking sleeve 29 is moved axially in the direction of the arrow **29*c*, its edge teeth are disengaged from the teeth 27 of the ring 21** and the latter can be rotated to tighten or loosen the engagement of the jaws upon the shank of a drill bit.

Naturally when the oblique flanks of the teeth 27 have angles which permit the locking sleeve 29 to be cammed away upon forcible rotation of the ring 21, separate retraction of this locking sleeve is not necessary, i.e. the rotation of the ring 21 by the key 26 will suffice to displace the locking sleeve 29 axially in a ratchet fashion and enabling unlocking or locking of the chuck.

I claim:

1. A percussion drill chuck assembly which comprises:

a hollow rotary drill spindle having an annular shoulder formed with a first annular surface facing in one axial direction;

a chuck body mounted on said spindle and formed with jaws adapted to receivably engage a drill bit, said spindle and said body having coaxial portions;

a ram extending axially through said spindle and into said body for impacting against said drill bit, said ram being axially movable relative to said spindle and said body;

coupling means between said portions and including a coupling ring surrounding said portions and having a plurality of selected positions of angular displacement relative to said spindle including a first position wherein said coupling means enables axial removal of said body from said spindle and second and third positions wherein said body is retained on said spindle, said ring having a second annular surface confronting said shoulder; and respective formations on said first and second surfaces axially oriented in said second position of said ring relative to said spindle to permit limited axial displacement of said body relative to said spindle and being axially oriented to support said first and second surfaces against one another in said third position of said ring whereby relative axial displacement of said body and said spindle is substantially blocked, said ring being braced against said body.

2. The assembly defined in claim 1 wherein said coupling means includes at least one axially extending coupling member forming a key between said coaxial portions, said spindle having a first recess formed at said portion thereof for receiving said member, said body having a second recess formed at said portion thereof through which said member can pass radially, and said ring having a concavity registering with said first and second recesses in said first position of said ring whereby said member is disengageable from said portion of said spindle to enable axial withdrawal of said body from said spindle.

3. The assembly defined in claim 2 wherein one of said first and second recesses is longer than said member in an axial direction by an amount defining the axial displacement permitted in said second position of said ring.

4. The assembly defined in claim 3, further comprising indexing means between said ring and said shoulder for releasably retaining said ring in a selected one of said positions.

5. The assembly defined in claim 4 wherein said indexing means includes at least one axially spring-biased pin on said ring and a plurality of depressions formed in said shoulder and engageable by said pin.

6. The assembly defined in claim 5 wherein a pair of such coupling members and respective recesses are provided at diametrically opposite sides of said coaxial portions.

7. The assembly defined in claim 6 wherein said coupling members are end-rounded cylindrical pins.

8. The assembly defined in claim 7 wherein said indexing means includes a pair of spring-loaded axially displaceable pins, carried by said ring and selectively engageable in respective triads of depressions formed in said shoulder.

9. The assembly defined in claim 8 wherein said formations include a radial groove formed in one of said first and second surfaces and a radial rib projecting axially and dimensioned to be received in said groove, said rib being formed on the other of said first and second surfaces.

10. The assembly defined in claim 9 wherein said rib is formed on said ring and said groove is formed on said shoulder.

11. The assembly defined in claim 10 wherein said groove and said rib are of trapezoidal cross section.

12. The assembly defined in claim 11 wherein said body is formed with a plurality of angularly equispaced guides inclined in said axial direction away from one another and receiving respective jaws and an operating ring engageable with said jaws and rotatable on said body for advancing and retracting said jaws, said operating ring having an array of teeth engageable by a chuck key.

13. The assembly defined in claim 12 wherein said operating ring is formed with a further second array of teeth on a side thereof opposite the first mentioned array, said assembly further comprising an axially shiftable locking sleeve surrounding said body and having a third array of teeth engageable with said second array of teeth, said locking sleeve being keyed to said body against rotation relative thereto.

14. The assembly defined in claim 13 wherein said operating ring is affixed to an actuating sleeve and said locking sleeve has a portion extending into said actuating sleeve.

15. The assembly defined in claim 14 wherein said body is formed with clearing bores communicating with the interior of said body, substantially at a location at which said ram contacts said bit, for discharging drilling wastes externally of said body, asid bores opening at an external surface of said body.

16. The assembly defined in claim 15 wherein said locking sleeve defines an axial clearance opening outwardly and into which said bores open.

* * * * *